United States Patent [19]

Hsieh

[11] Patent Number: 5,253,497
[45] Date of Patent: Oct. 19, 1993

[54] MULTI-FUNCTION AUTOMOBILE STEERING LOCK

[76] Inventor: Ta-Young Hsieh, No. Alley 13, Lane 54, Sec. 2, Hsing-Nan Rd., Jung-Heh,, Taipei Hsien, Taiwan

[21] Appl. No.: 837,633

[22] Filed: Feb. 13, 1992

[51] Int. Cl.⁵ .......................................... B60R 25/02
[52] U.S. Cl. ....................................... 70/209; 70/226; 70/238
[58] Field of Search .................. 70/209–211, 70/225, 226, 237, 238, 233

[56] References Cited

U.S. PATENT DOCUMENTS

| | | | |
|---|---|---|---|
| 4,674,306 | 6/1987 | Halpern | 70/233 |
| 4,848,110 | 7/1989 | Kuo | 70/238 X |
| 4,887,443 | 12/1989 | Wang | 70/209 |
| 4,935,047 | 6/1990 | Wu | 70/209 |
| 4,959,981 | 10/1990 | Davidson | 70/238 |
| 5,022,246 | 6/1991 | Wang | 70/209 |
| 5,031,428 | 7/1991 | Jan et al. | 70/209 |
| 5,040,388 | 8/1991 | Chen | 70/226 X |
| 5,042,278 | 8/1991 | Wang | 70/209 |
| 5,062,282 | 11/1991 | Rong | 70/209 |
| 5,069,048 | 12/1991 | Lo | 70/209 |

*Primary Examiner*—Peter M Cuomo
*Assistant Examiner*—Suzanne L. Dino

[57] ABSTRACT

A multi-function automobile steering lock having a similar structure as a conventional steering lock comprising a rod member to extend in a telescopic manner in a body tubular member to adjust its length to engage two opposite hooks with two opposite portions of a steering wheel of an automobile and to lock the rod member immovable, the rod member provided with a hollow lengthwise cavity for storing a driver half-hidden in the cavity and half-hidden in the body tubular member, the rod member also provided with a square projection extending from its outer end to fit with an impact socket having a deep square hole and two different sized 6 point holes at both ends to be used as a socket wrench.

6 Claims, 4 Drawing Sheets

MULTI-FUNCTION AUTOMOBILE STEERING LOCK

BACKGROUND OF THE INVENTION

A conventional automobile steering lock generally has only one function which is to lock a steering wheel of an automobile, and is unable to be used as a repair tool.

SUMMARY OF THE INVENTION

The multi-funtion automobile steering lock in the present invention has been devised to have the following advantageous functions.

1. It can be used to lock a steering wheel of an automobile;
2. It can be used as a screw driver; and,
3. it can also be used as an impact socket wrench.

DETAILED DESCRIPTION OF THE PREFERRED EMBODIMENT

Figure 1:
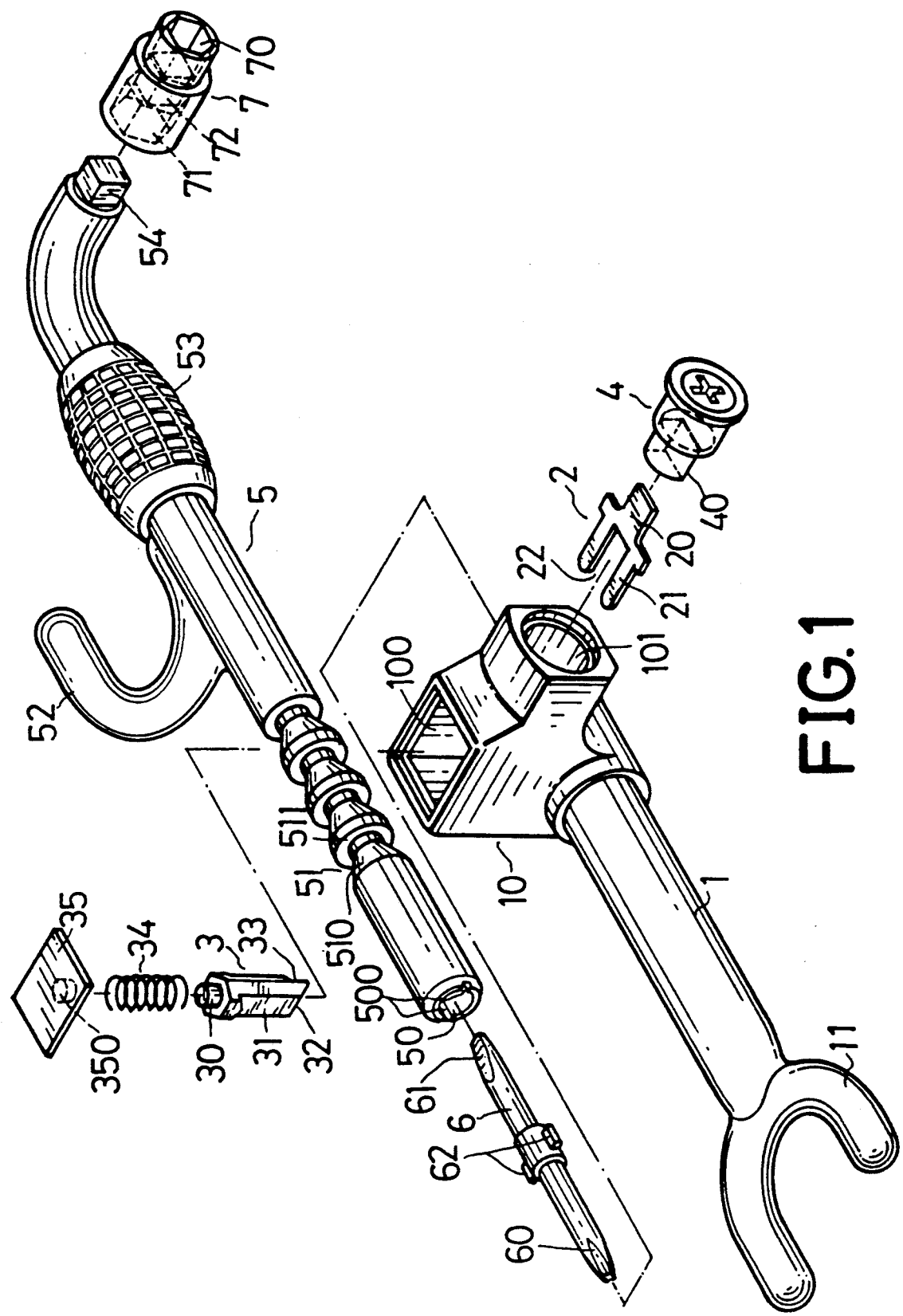
FIG. 1 is an exploded perspective view of the multifunction automobile steering lock according to the present invention.
Figure 2:
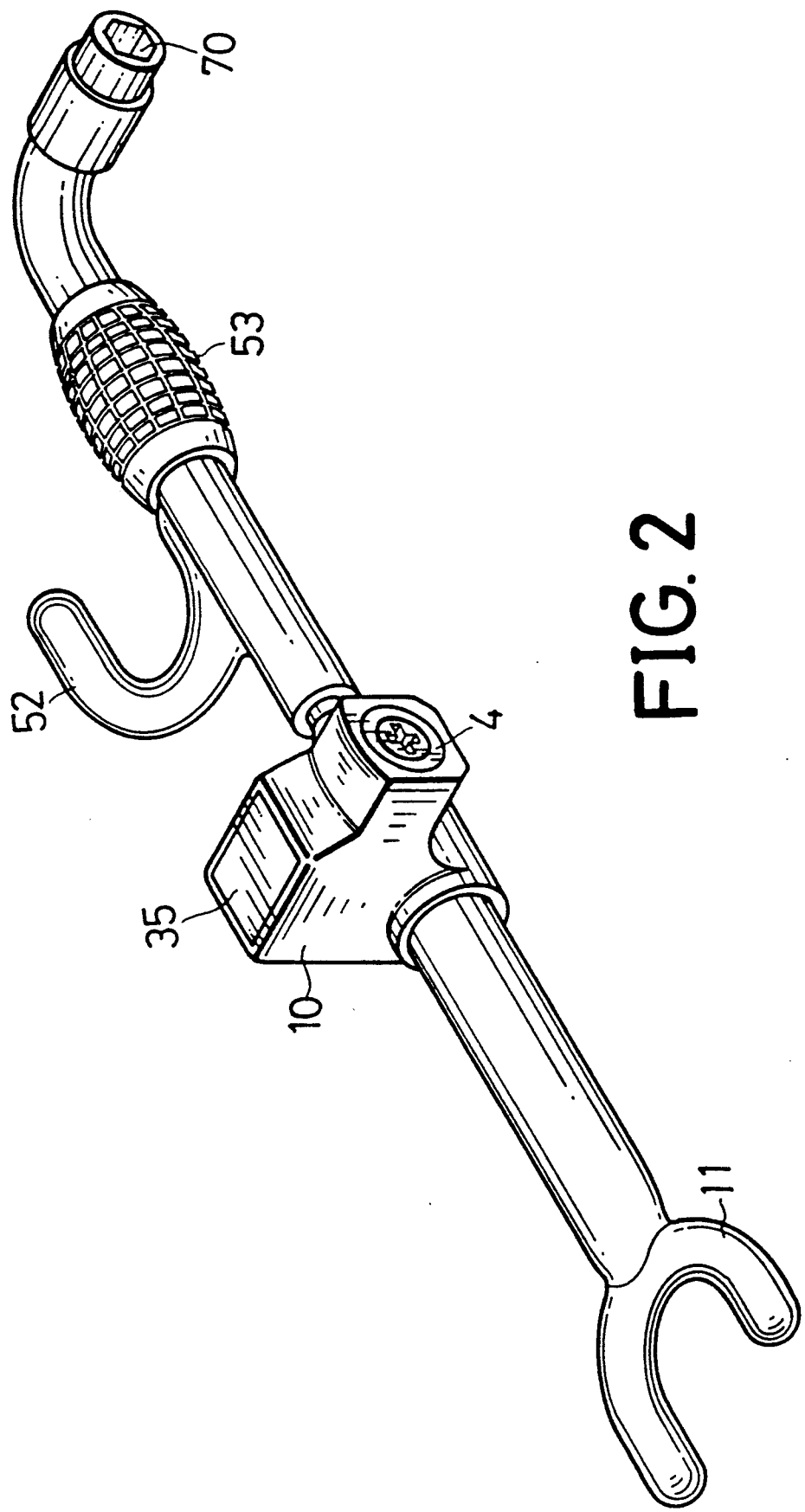
FIG. 2 is a perspective view of the multi-function automobile steering lock according to the present invention.

Referring to FIGS. 1 and 2, a multifunction automobile steering lock according to the invention which comprises an elongated body tubular member 1, an elongated rod member 5 which is dimensioned to move in a telescopic way within the body member 1, hooks 11, 52 for engaging opposite portions of a steering wheel from the inside thereof being respectively provided on the body member 1 and the rod member 5, a housing 10 firmly formed around the inner end portion of the body member 1, a locking mechanism including a locking means 4, a locating means including a bearing 3 and a biasing spring 34, a driver 6 and an impact socket 7.

The elongated body tubular member 1 has a circular central passageway running through the body member and an opening 12 at the inner end. The first U-shaped hook 11 is fixedly secured at the outer end, opening rearwardly, and the housing 10 is fixedly secured around the inner end portion.

The elongated rod member 5 has a circular cross-section of which the outer diameter is dimensioned slightly less than the diameter of the central passageway in the body member 1 to enable the rod member 5 to telescope within the body member 1. The second U-shaped hook 52 is fixedly secured to the rear portion of the rod member 5 such that it opens opposite to the hook 11 for engagement with a diametrically opposite portion of a steering wheel. A plurality of annular grooves 51 are circumferentially provided along a major portion of the rod member. Each of the annular grooves 51 has of a vertical side wall 511 perpendicular to the longitudinal direction of the rod member and relatively close to the second hook 52, and a slope side wall 510 relatively far from the second hook 5. A global grip 53 is provided just behind the hook 52 near the bent end which is formed into a square projection 54. In addition, the rod member 5 also has a central hollow cavity 50 in the inner end portion for storing a screw driver 6 and two opposite notches 500 around the opening of the cavity 50.

The housing 10 is formed around the inner end portion of the body member 1 to form an integral structure therewith, the inner end portion of the body member 1 extends therethrough and contains the locking mechanism including the locking means 4, an actuating plate 2 and locating means 30 and 34. The housing includes a bore 100 for receiving the bearing 3 and the spring 34 and capped with a cap 35 and another round bore 101 for receiving the actuating plate 2 and the locking means 4 which has a conventional key lock and a locking member 40 of cylindrical shape. The actuating plate 2 has a pressing plate 20 and two feet 21 defining an opening 22 for the bearing 3 to fit and to move up and down therein.

The round bore 101 is for positioning the actuating plate 2 and the locking means 4, interconnecting the bore 100, which communicates with the central passageway of the body member 1. The square bore 100 is for positioning the bearing 3 and the biasing spring 34 therein and capped with a cap 35 so that the bearing 3 can be pushed down elastically by the spring 34, with its bottom tenon end to extend into the central passageway of the body member 1 to engage an annular groove 51 in the rod member 5.

The bearing 3 is of a hexagonal shape, having a round projection 30 at the top, two M-shaped sides 31, a slope 32 at the bottom end of the left M-shaped side 31 and a L-shaped tip 33 at the bottom end of the right M-shaped side 31.

The biasing spring 34 is placed on the top of the bearing 3 around the projection 30, having its top end pushed by the cap 35 fixed at the opening of the bore 100, stabilized around a central projection 350 under the cap 35.

A screw driver 6 is stored in the central hollow cavity 50 in the rod member 5, having one cross-shaped end tip 60, another flat end tip 61 and two opposite lengthwise projections 62 to engage the two opposite notches 500 in the rod member 5 such that the screw driver 6 can be held stored half in the central passageway in the body member 1 and half in the central hollow cavity in the rod member 5, able to be adapted to be used as a screw driver.

An impact socket wrench 7 is provided to fit with the outer bent end of the rod member 5, having a 6 point hole respectively at both ends and a square hole 72 deep in the socket to fit with the square projection 54 at the outer end of the rod member 5, able to be used as a socket wrench.

Figure 3:
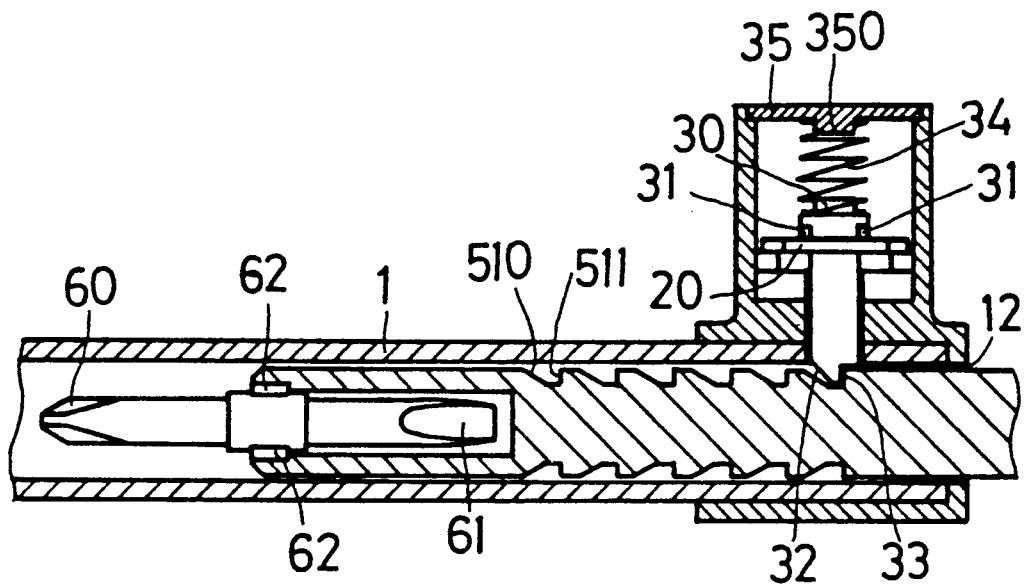
FIG. 3 is a cross-sectional view of the bearing and the rod member in relation to the body member in the present invention.
Figure 4:
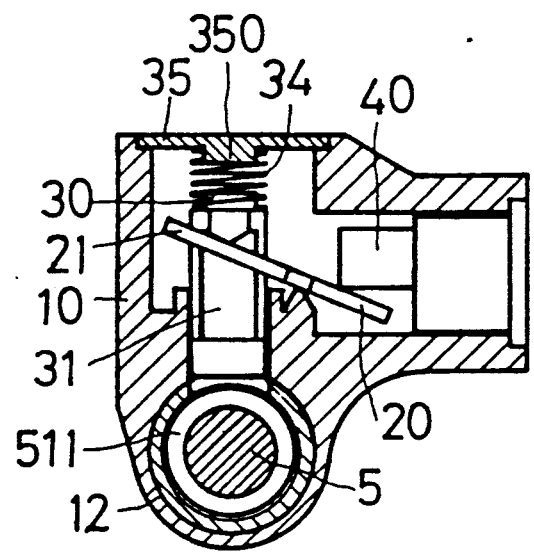
FIG. 4 is a cross-sectional view of the locking mechanism in the present invention.

When this lock is to be attached to a steering wheel of an automobile, at first the hook 11 is placed on a portion of the steering wheel from the inside, and then the rod member 5 is pulled outward in the passageway in the body member 1, letting the slope 32 of the bearing 3 slide along the slope side walls 510 of the annular grooves 51 by means of the elasticity of the spring 34 as shown in FIG. 3 under the locked condition of the locking mechanism, and engaging the hook 52 on an opposite portion of the steering wheel to lock this lock. When this lock is to be taken off the steering wheel, the locking means 4 has to be unlocked with a correct key, with the pressing plate 2 pressed down by the locking member 40 and with the tenon bottom end of the bearing 3 leaving off an annular groove 51, enabling the rod member 5 to move inward in the central passageway of the body member 1. Then this lock can be taken off the steering wheel.

Figure 5:
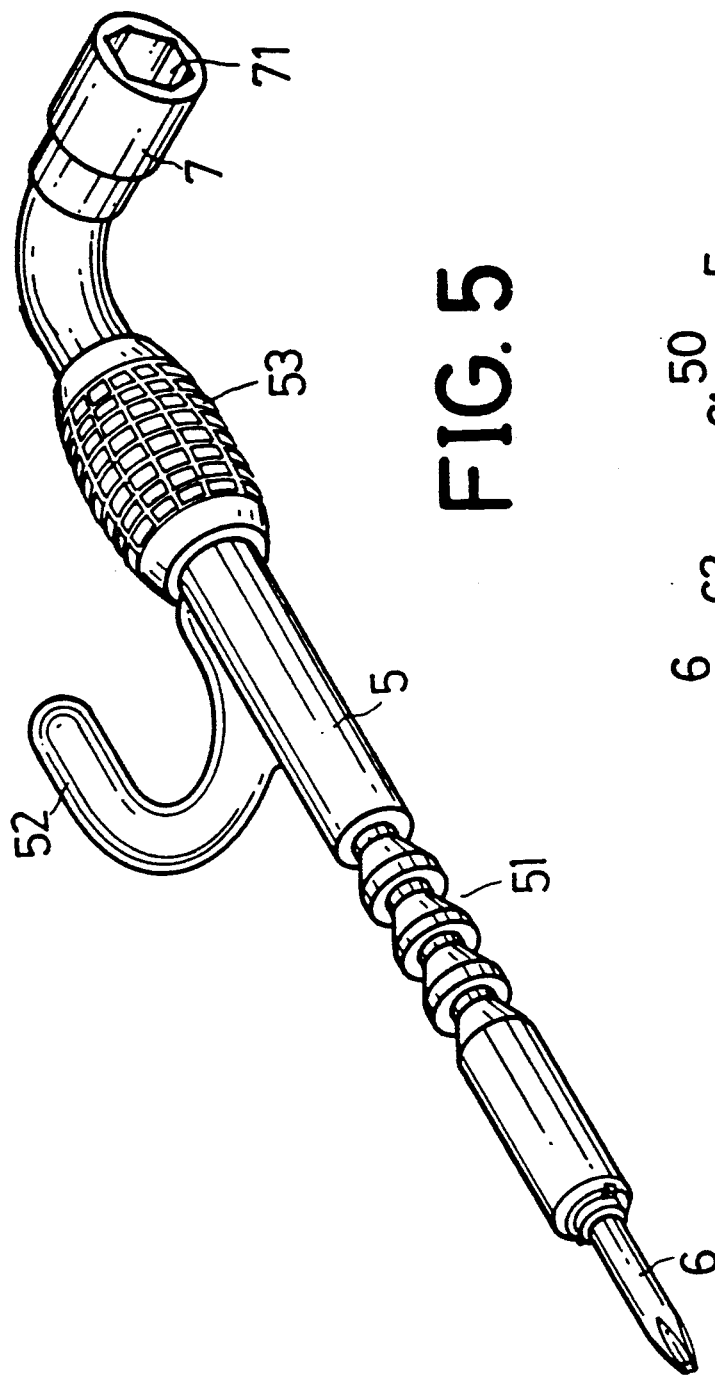
FIG. 5 is a perspective view of a screw driver and an impact socket wrench adapted with the rod member in the multi-function automobile steering lock in the present invention.
Figure 6:
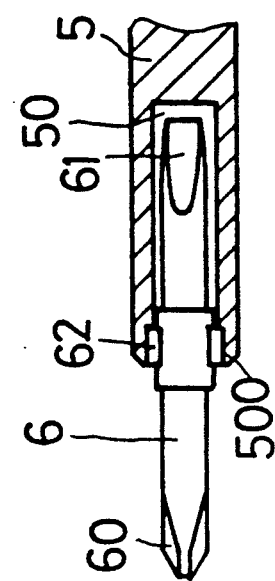
FIG. 6 is a cross-sectional view of a screw driver disposed in the rod member in the multi-function autombile steering lock according to the present invention.

This lock can be adapted to be used as an impact socket wrench and a screw driver to change a tire or take off a bolt or a screw, by pulling the rod member 5 completely out of the body member 1 as shown in FIG. 5. Then the screw driver 6 half hidden in the rod member 5 will be exposed and can be used with the cross-shaped tip or the flat tip by reversing the screw driver 6 and fitting the projections 62 in the notches 500. The impact socket wrench 7 fitted with the outer end of the rod member 5 can be used as a socket wrench, having two different sized 6 point holes 70, 71 to be selected for use.

What is claimed is:

1. A multi-function automobile steering lock comprising:

an elongated body tubular member having an inner end, an outer end and an elongated passageway extending along its axis therethrough, said tubular member having a first U-shaped hook extending from the outer end adapted to engage a steering wheel from the inside thereof;

an elongated rod member adapted to extend in a telescopic fashion within said passageway of said body tubular member and having a second U-shaped hook secured sidewise near a rear portion of the rod member, said second hook having an opening facing opposite to the first hook and adapted to engage said steering wheel from the inside thereof;

a plurality of spaced annular grooves defined by the elongated rod member, each of which has a vertical-side wall relatively close to the second hook and a sloped side wall relatively far from the second U-shaped hook, circumferentially formed in a portion of the rod member;

a housing firmly attached to the inner end portion of said body tubular member with the passageway of said tubular member extending therethrough, said housing having a vertical bore for positioning a bearing, a biasing spring and capped with a cap and a horizontal bore for positioning a locking means and an actuating plate;

a locking means having a key lock and a locking member;

an actuating plate having a pressing plate and two feet defining an opening therebetween for a bearing to pass through and to move up and down therein, said actuating plate adapted to be pressed down to force the bearing to move up to disengage from an annular groove in the rod member;

a bearing positioned in the vertical bore in the housing and having a tenon bottom end and a top surface to be pushed down by a biasing means between a locking position with the tenon end protruding into an annular groove in the rod member and an unlocking position with the tenon end withdrawn from said annular groove;

a biasing spring disposed between said bearing and said cap so as to bias said bearing towards the passageway in said body tubular member; and, a central hollow lengthwise cavity defined in an inner end portion of the elongated rod member and a threaded fastener driver having at least a portion located in the central hollow cavity, said driver having two opposite lengthwise projections at the longitudinal center adapted to fit in two opposite notches defined around the central hollow cavity in the rod member.

2. A multi-function automobile steering lock of claim 1 further comprising a square projection extending from an outer end of the rod member, and an impact socket being fitted with the square projection.

3. The multi-function automobile steering lock of claim 2 wherein the impact socket comprises two different sized socket portions at opposite ends and defines a central square opening adapted to accommodate the square projection.

4. The multi-function automobile steering lock of claim 1 wherein the threaded fastener driver comprises a screw driver.

5. The multi-function automobile steering lock of claim 4 wherein the screw driver has different screw head engagement tips on opposite ends.

6. The multi-function automobile steering lock of claim 5 wherein the screw engagement tips comprise a Phillips type screw driver tip and a flat blade screw driver tip.

* * * * *